US007731501B2

(12) United States Patent
Hagan

(10) Patent No.: US 7,731,501 B2
(45) **Date of Patent: *Jun. 8, 2010**

(54) UNDERWATER DRAWING TABLET

(76) Inventor: Mark Lloyd Hagan, 990 Bradley Hill Rd., Nyack, NY (US) 10960

( * ) Notice: Subject to any disclaimer, the term of this patent is extended or adjusted under 35 U.S.C. 154(b) by 0 days.

This patent is subject to a terminal disclaimer.

(21) Appl. No.: 11/897,968

(22) Filed: Aug. 31, 2007

(65) Prior Publication Data

US 2008/0060855 A1 Mar. 13, 2008

Related U.S. Application Data

(62) Division of application No. 10/842,385, filed on May 10, 2004, now Pat. No. 7,264,477.

(60) Provisional application No. 60/471,489, filed on May 15, 2003.

(51) Int. Cl.
*G09B 5/00* (2006.01)

(52) U.S. Cl. .................................................... 434/408

(58) Field of Classification Search .................. 434/408
See application file for complete search history.

(56) References Cited

U.S. PATENT DOCUMENTS

| | | | | | |
|---|---|---|---|---|---|
| 2,883,770 | A | * | 4/1959 | Lieb | 434/433 |
| 3,781,536 | A | * | 12/1973 | Naeseth et al. | 362/34 |
| 4,083,136 | A | * | 4/1978 | Zelenko | 40/518 |
| 4,960,399 | A | | 10/1990 | Lyon | |
| 4,995,015 | A | * | 2/1991 | Chiang | 368/11 |
| 5,083,242 | A | * | 1/1992 | Piotrowski | 362/34 |
| 5,148,718 | A | * | 9/1992 | Kakuguchi et al. | 74/553 |
| 5,361,169 | A | * | 11/1994 | Deal | 359/838 |
| 5,447,215 | A | | 9/1995 | Volkmar et al. | |
| 5,531,481 | A | * | 7/1996 | Wiltshire | 281/44 |
| 5,956,291 | A | * | 9/1999 | Nehemiah et al. | 367/131 |
| 6,098,793 | A | | 8/2000 | Jaksha | |
| 6,116,484 | A | * | 9/2000 | Allen | 224/197 |
| 6,161,740 | A | * | 12/2000 | Allen | 224/197 |
| 6,468,461 | B1 | * | 10/2002 | Sumiyoshi et al. | 264/280 |
| 7,264,477 | B1 | * | 9/2007 | Hagan | 434/408 |
| 7,431,579 | B2 | * | 10/2008 | Downing | 425/141 |
| 2004/0191753 | A1 | * | 9/2004 | Meyerrose | 434/410 |
| 2004/0197758 | A1 | * | 10/2004 | Langford | 434/317 |

* cited by examiner

*Primary Examiner*—Gene Kim
*Assistant Examiner*—Dolores Collins
(74) *Attorney, Agent, or Firm*—Cooper & Dunham LLP

(57) ABSTRACT

An underwater writing and drawing tablet that stretches a length of waterproof (plastic) vellum between two rollers over a flat surface thereby enabling the user to easily draw or write on said vellum and permanently save the drawing and writing.

18 Claims, 11 Drawing Sheets

Submersible Drawing Tablet

Submersible Drawing Tablet

Submersible Drawing Tablet

Submersible Drawing Tablet

Submersible Drawing Tablet

Submersible Writing Tablet
Second Embodiment

Submersible Writing Tablet
Second Embodiment

Submersible Writing Tablet
Second Embodiment

Submersible Writing Tablet
Second Embodiment

Submersible Writing Tablet
Second Embodiment

125 TOP

UNDERWATER DRAWING TABLET

This application is a divisional of U.S. Ser. No. 10/842,385 filed May 10, 2004, now U.S. Pat. No. 7,264,477 issued Sep. 4, 2007, claiming the benefit U.S. Provisional Application No. 60/471,489, filed May 15, 2003, the entire contents of each of which are incorporated herein by reference.

BACKGROUND

This disclosure relates to scuba diving and more specifically to a submersible tablet for use in writing and drawing.

There are many reasons a scuba diver may need to write or draw underwater. The first is to communicate with other divers. Other uses are to record notes, to aid in gathering reference material, architectural drafting for marine construction and artistic rendering as is done at underwater archeological sites.

Presently most underwater communication is accomplished with hand signals or dive slates. Hand signals can be confusing and are limited in what they can communicate. Dive slates are limited in the amount that they can record by the size of the slate. When the slate is full, new writing can only be added by erasing all previous work. In urgent situations this erasing time can be inconvenient. Some communication is performed electronically but this is expensive and vulnerable to the underwater environment.

The use of multiple pages of waterproof material on a clipboard underwater is awkward because in the marine environment the pages can stick together and are difficult to manipulate especially if the diver is wearing gloves. Multiple page slates also cannot be reused until all previous work has been erased.

SUMMARY

In an aspect of this disclosure, a novel submersible drawing and writing tablet is provided in which all writing and drawing is of a permanent nature.

In another aspect of this disclosure, a novel submersible drawing and writing tablet is provided that will provide an unlimited amount of workable media underwater.

In another aspect of this disclosure, novel submersible drawing and writing tablet is provided that can provide workable media quickly and easily in an underwater environment through the use of scrolls rather than pages.

In another aspect of this disclosure, a writing and drawing surface is provided that is phosphorescent to accommodate working in low light conditions.

In another aspect of this disclosure, a novel submersible drawing and writing tablet is provided that is of simple construction, does not involve the use of electronics and is impervious to the demands of the marine environment.

In another aspect of this disclosure, a novel submersible drawing and writing tablet is provided that can be economically manufactured and marketed.

In another aspect of this disclosure, a novel submersible drawing and writing tablet that is designed to have a buoyancy underwater that renders it nearly weightless and will shed air and water so as not to encumber the diver as he or she enters or leaves the water.

In another aspect of this disclosure, a novel submersible drawing and writing tablet is provided that can be easily disassembled for travel.

According to another aspect of this disclosure, an underwater writing table includes first and second plastic rollers, first and second rotation knobs fitted at respective ends of the first and second plastic rollers, a face plate positioned between the first and second plastic rollers, and a plastic vellum sheet rolled around the first and second plastic rollers and placed over the face plate, wherein the plastic vellum sheet rolls between the first and second plastic rollers when the first or second rotation knob is rotated by the user.

According to another aspect of this disclosure, a wrist-mounted underwater writing tablet includes first and second plastic rollers positioned in a direction parallel to the user's arm, first and second rotation knobs fitted at respective ends of the first and second plastic rollers, a cover plate including first and second arm belt slots and first and second vellum slots, and a plastic vellum sheet rolled around the first and second plastic rollers and placed over the cover plate and passing through the first and second vellum slots, wherein the plastic vellum sheet rolls between the first and second plastic rollers when the first or the second rotation knob is rotated by the user.

Features and aspects believed to be novel are set forth with particularity in the appended claims. The subject matter of this disclosure, both as to organization and method of operation, together with further features, aspects and advantages thereof, may be best understood by reference to the following description taken in conjunction with the accompanying drawings.

DETAILED DESCRIPTION OF THE INVENTION

Figure 1:
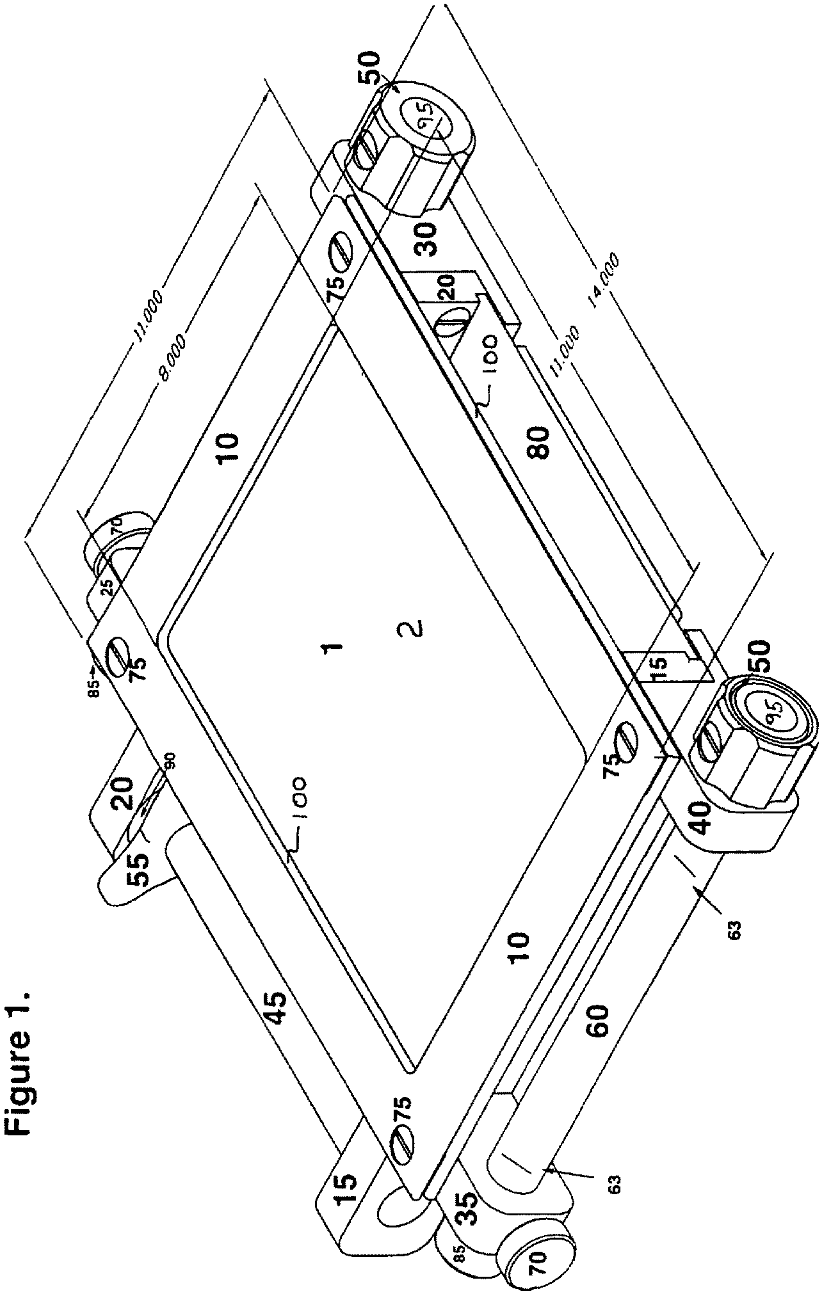
FIG. 1 is a perspective view of a first embodiment of the underwater drawing tablet according to the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

First Embodiment

The novel underwater drawing tablet according to the first embodiment of the present invention is a hand held device as shown in FIG. 1. The diver can draw or write continuously, accessing various writing instruments such as pencils (not shown) stored in a drawer 80 and advancing a plastic writing material easily with one hand while the other stabilizes the tablet through the use of a handle 45 on one side.

The tablet is designed, through the use of buoyant materials such as polystyrene, to have a slightly negative buoyancy at a depth of about fifty feet so that it can be very easy to manipulate underwater and will not sink or ascend rapidly if let go.

Underneath the face plate 1 used as a drawing table is a retractable drawer 80 to hold drawing instruments (not shown) through the use of a hook and loop material on its surface and that of the drawing instrument holders. The drawer 80 can be locked in an extended position or in a retracted position. The drawer 80 does not have sides so that it will not retain air or water during entrances or exits of the water's surface.

On each end of the face plate 1 used as a drawing table are rollers 60 and 65 for holding lengths of plastic vellum 2 (not shown for clarity) used as the drawing support. Through the use of grips 50 on the ends of the rollers 60 and 65 the plastic vellum 2 can be wound from one roller to the other as it is used.

The submersible drawing tablet parts are constructed of various plastic resin materials that are impervious to salt water such as polycarbonate, acrylic Plexiglas and polystyrene. The acrylic Plexiglas is produced in bright florescent colors so that the pallet can be located easily if it is set aside underwater where visibility can be poor.

The submersible drawing tablet is designed so that it can easily be disassembled for travel.

The first embodiment of the submersible writing and drawing tablet will now be described by referring to FIGS. 1-6. The overall submersible writing and drawing tablet is shown in FIG. 1.

All writing and illustration is done on rolls of plastic vellum with a writing instrument such as a graphite pencil. The vellum 2 is wound onto the lower vellum roller 60. The lower roller 60 is made of buoyant polystyrene and has a small diagonal vellum slot 63 on each side of the roller to grasp the vellum as it is being loaded onto the roller. The lower roller 60 is supported by the left and right lower roller supports 35 and 40. The lower roller 60 extends past the left and right roller supports 35 and 40 and is held in place by the left roller end knob 85 on the left and the rotation knob 50 and the right roller end knob 95 on the right. The vellum 2 is advanced or rewound by turning the rotation knobs 50. The plastic vellum 2 (not shown for clarity) extends from the lower roller 60, over the face plate 1 and is attached to the upper vellum roller 65 (not visible in FIG. 1) by means of two other diagonal vellum slots 63 shown in FIGS. 1 and 5. The face plate 1 is constructed of phosphorescent polypropylene or Plexiglas to accommodate working in low light conditions. The face plate 1 can also include a grid (not shown) as a drawing aid. The upper vellum roller 65 is held in place by the right and left roller supports 25 and 30, the right roller end knob 85 on the left and the rotation knob 50 and the right roller end knob 95 on the right.

The upper roller supports 25 and 30 are connected to the upper support rail 20 by two ⅜" flat head nylon screws 75. The lower roller supports 35 and 40 are connected to the lower support rail 15 by two ⅜" flat head nylon screws 75 shown in FIGS. 1 and 6. The vellum 2 is held tightly against the face plate 1 by use of the roller tension adjusting knobs 70 that apply pressure when turned clockwise to the upper and lower vellum rollers 60 and 65. The vellum 2 is also held in place on the face plate 1 by use of the drawing frame 10. The drawing frame 10 and the face plate 1 are attached to the upper and lower roller supports through separators 100 by four nylon screws 75 located in each corner. Vellum 2 travels between drawing frame 10 and face plate 1.

Figure 3:
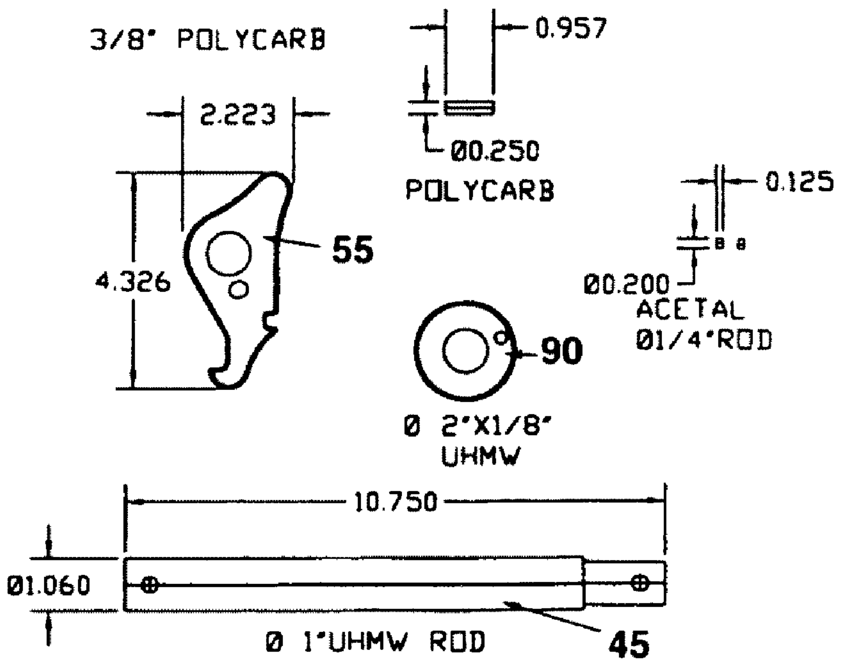
FIG. 3 is a detailed diagram showing the drawer latch assembly and handle of the first embodiment shown in FIG. 1.
Figure 4:
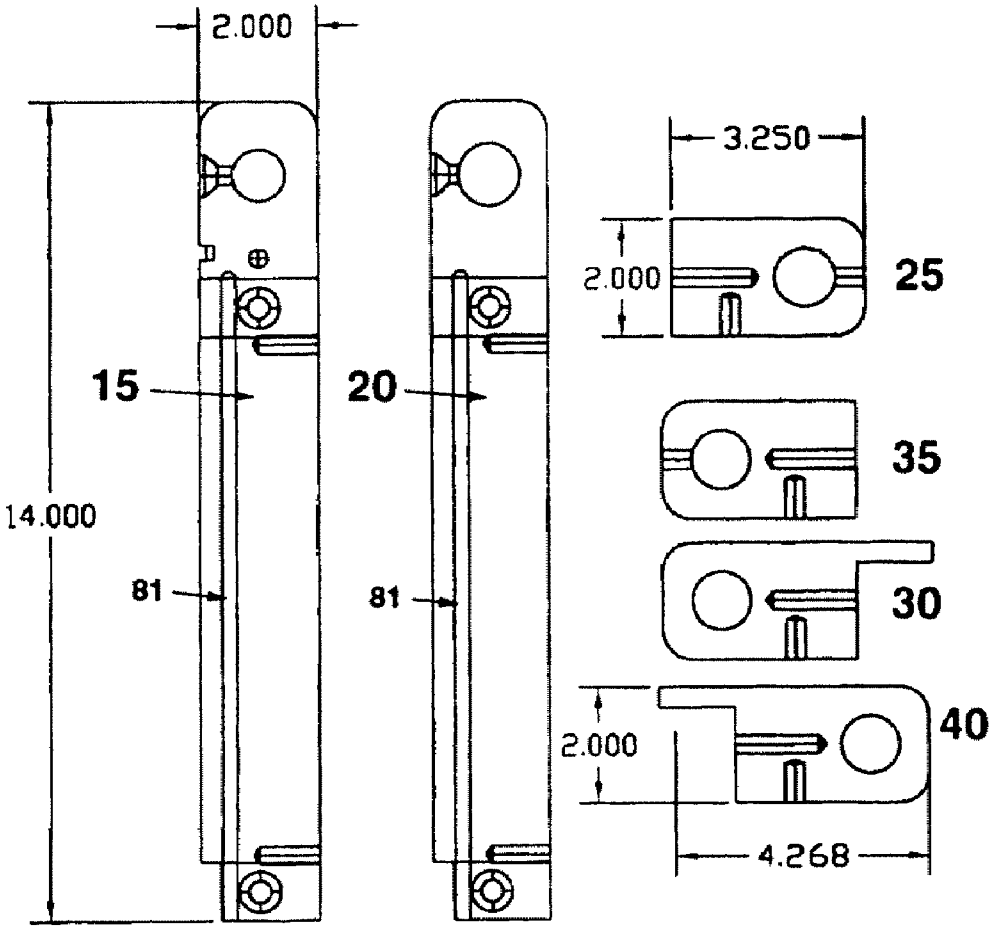
FIG. 4 is a detailed diagram showing the support rails and roller supports of the first embodiment shown in FIG. 1.
Figure 5:
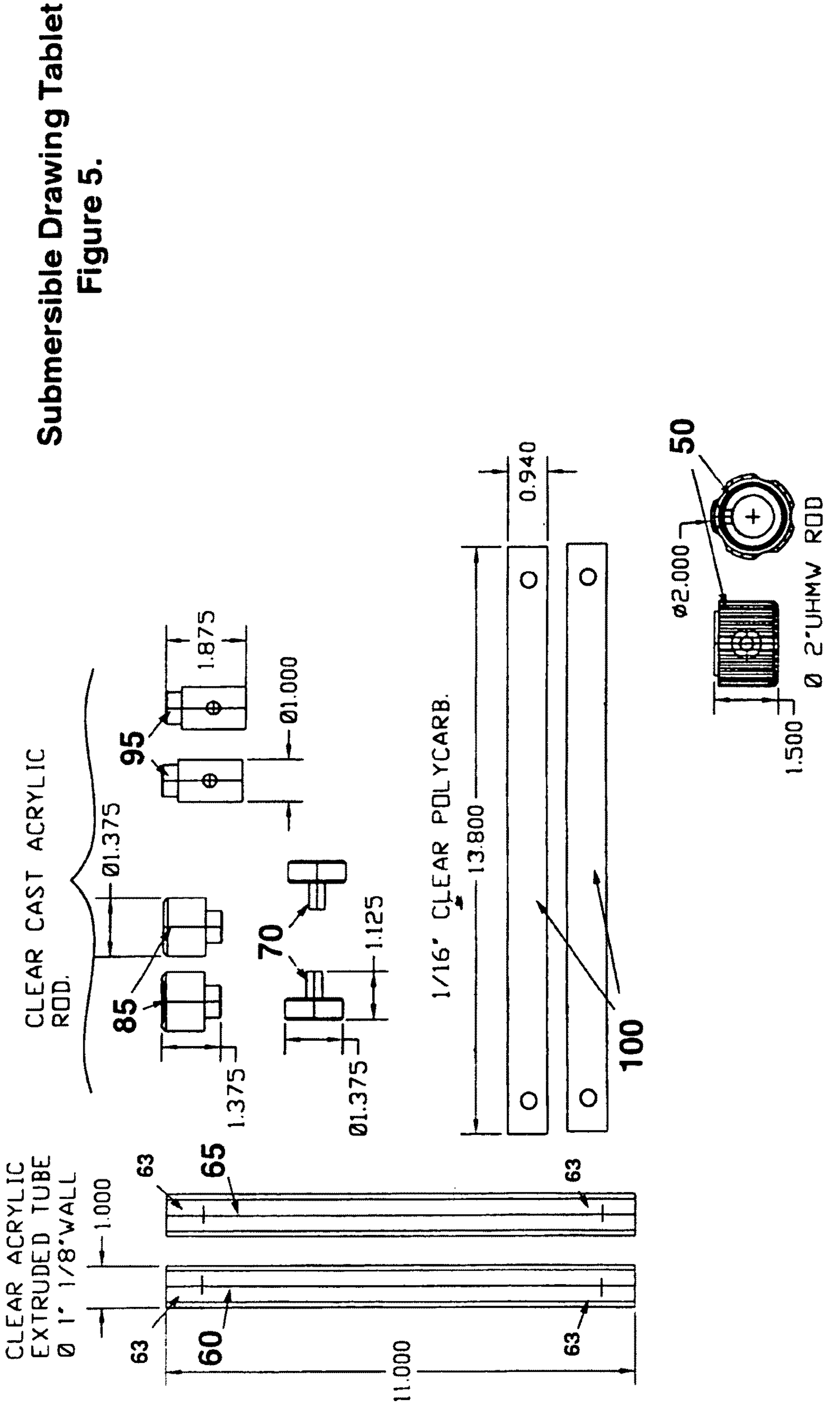
FIG. 5 is a detailed diagram showing the rollers and knobs of the first embodiment shown in FIG. 1.

The upper and lower support rails 20 and 15 extend beyond the left side of the face plate 1 and drawing frame 10 to provide support for the handle 45 and the drawer latch assembly 55 and 90, details shown in FIG. 3. Fitted into the drawer grooves 81 shown in FIG. 4 on the inner sides of the upper and lower support rails 20 and 15 is the drawer 80.

Figure 2:
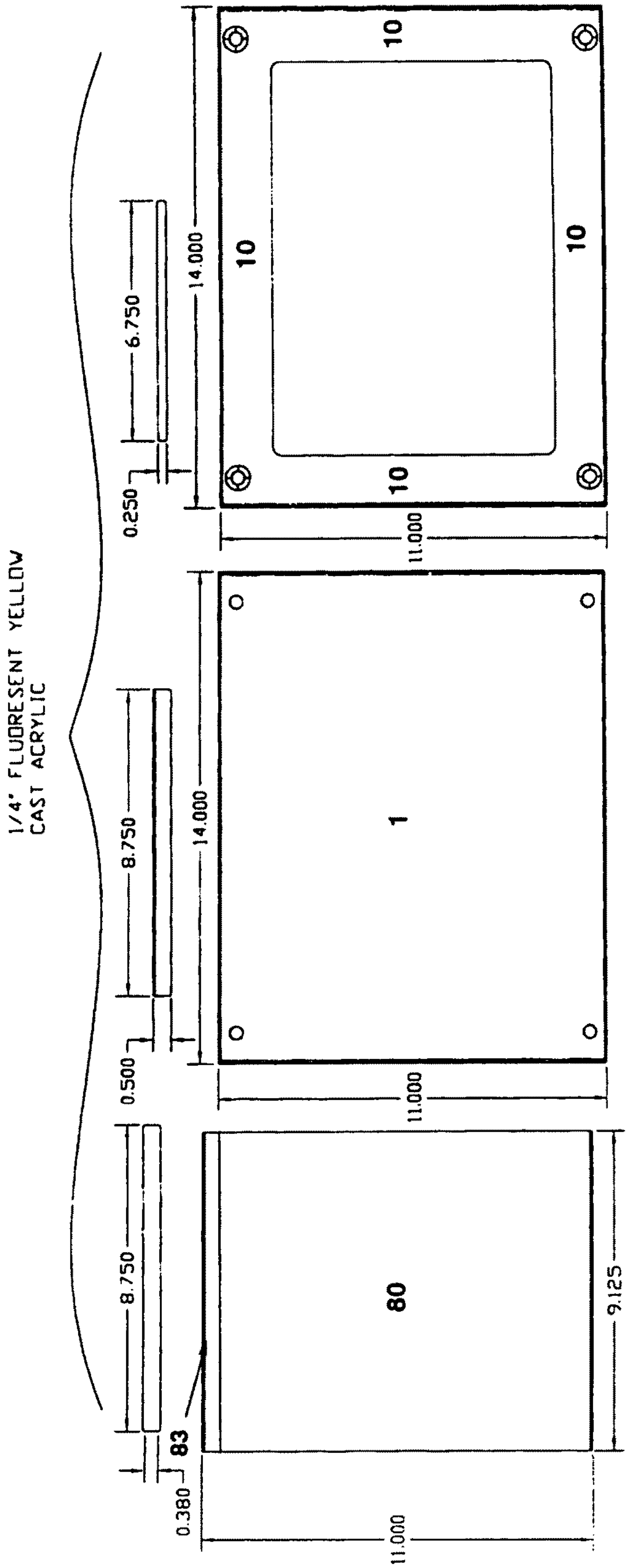
FIG. 2 is a detailed diagram showing the drawing frame, the face plate, and the drawer of the first embodiment shown in FIG. 1.

As shown in FIG. 2, along the back edge of the drawer 80 is the ¼" high drawer clasp 83 that is grasped by the drawer release trigger 55 (shown in FIG. 1). The drawer release trigger 55 applies pressure to the drawer clasp 83 by use of a common rubber band (not shown) wound through a notch in the trigger 55 and attached to a nylon screw 75 in the upper support rail 20. This is used to keep the drawer 80 retracted when not in use. The surface of the drawer 80 is covered with hook and loop material so that various writing and drawing instruments (not shown) that utilize the same material can be attached to it.

All the components of the submersible drawing and writing tablet are connected to each other through the use of the nylon screws 75. The width of the slot in these screws is designed to be used with a large coin such as a fifty-cent piece or a Peso rather than a screwdriver. In this way tools are not needed to assemble or disassemble the submersible tablet and the screws will resist stripping due to the lack of edges of the coins.

Second Embodiment

Figure 6:
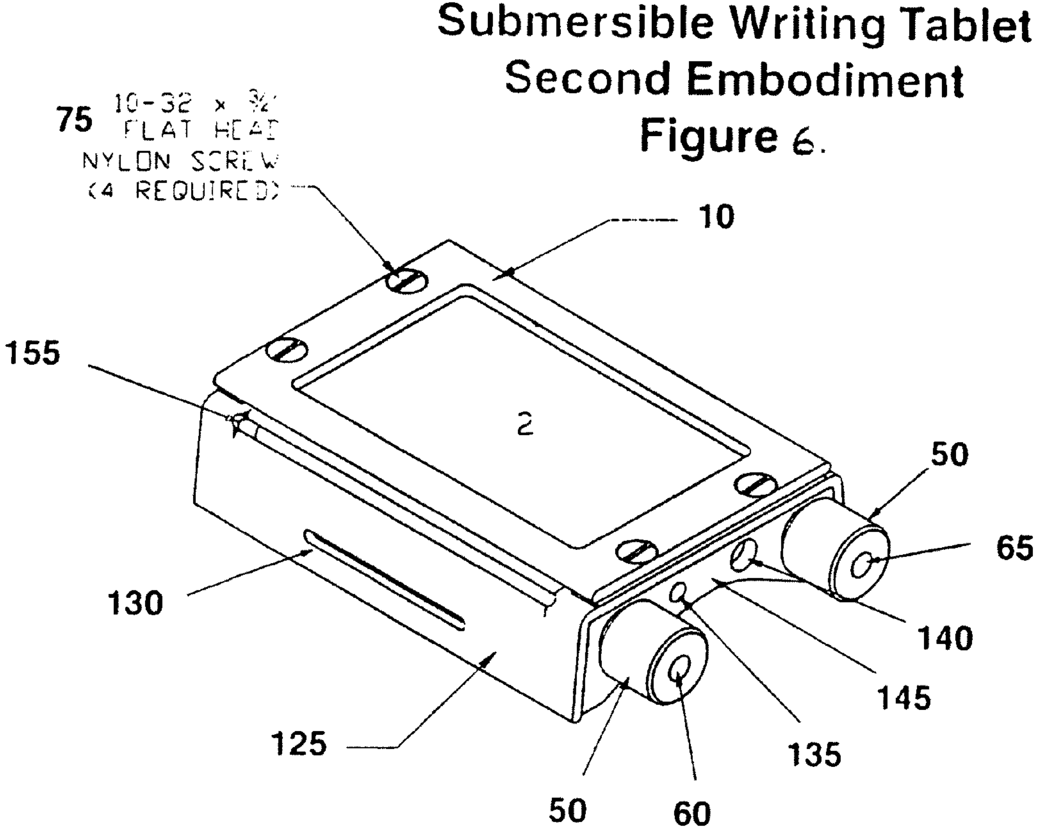
FIG. 6 is a perspective view of a second embodiment of the underwater drawing tablet according to the present invention.

The second embodiment of the present invention is shown in FIG. 6 and is a smaller version of the submersible writing tablet designed to be worn on the arm of the diver and used primarily for communication between scuba divers and for note taking. This second version also uses plastic vellum 2 stretched between two rollers 60 and 65 running parallel to the diver's arm. Writing on the vellum 2 is accomplished with a graphite pencil 170 held in a holder 140 under the drawing surface between the rollers. This smaller version does not have the utility drawer 80 of the larger version and is not designed to be collapsible. This wrist model also is constructed primarily of polycarbonate, acrylic and polypropylene. The device is worn on the diver's arm through the use of a length of hook and loop material 160 that is attached to the underside of the tablet and can be adjusted to accommodate the circumference of the diver's arm by the use of the hook and loop material.

The Second Embodiment of the submersible writing and drawing tablet will now be described by referring to FIGS. 6-11. The overall submersible writing and drawing tablet is shown in FIG. 6.

All writing and illustration is accomplished on rolls of plastic vellum 2. The vellum 2 is wound onto the lower vellum roller 60. As in the first embodiment, the roller also has a small diagonal vellum slot 63 on each side of the roller 60 to grasp the vellum as it is being loaded onto the roller 60.

Figure 7:
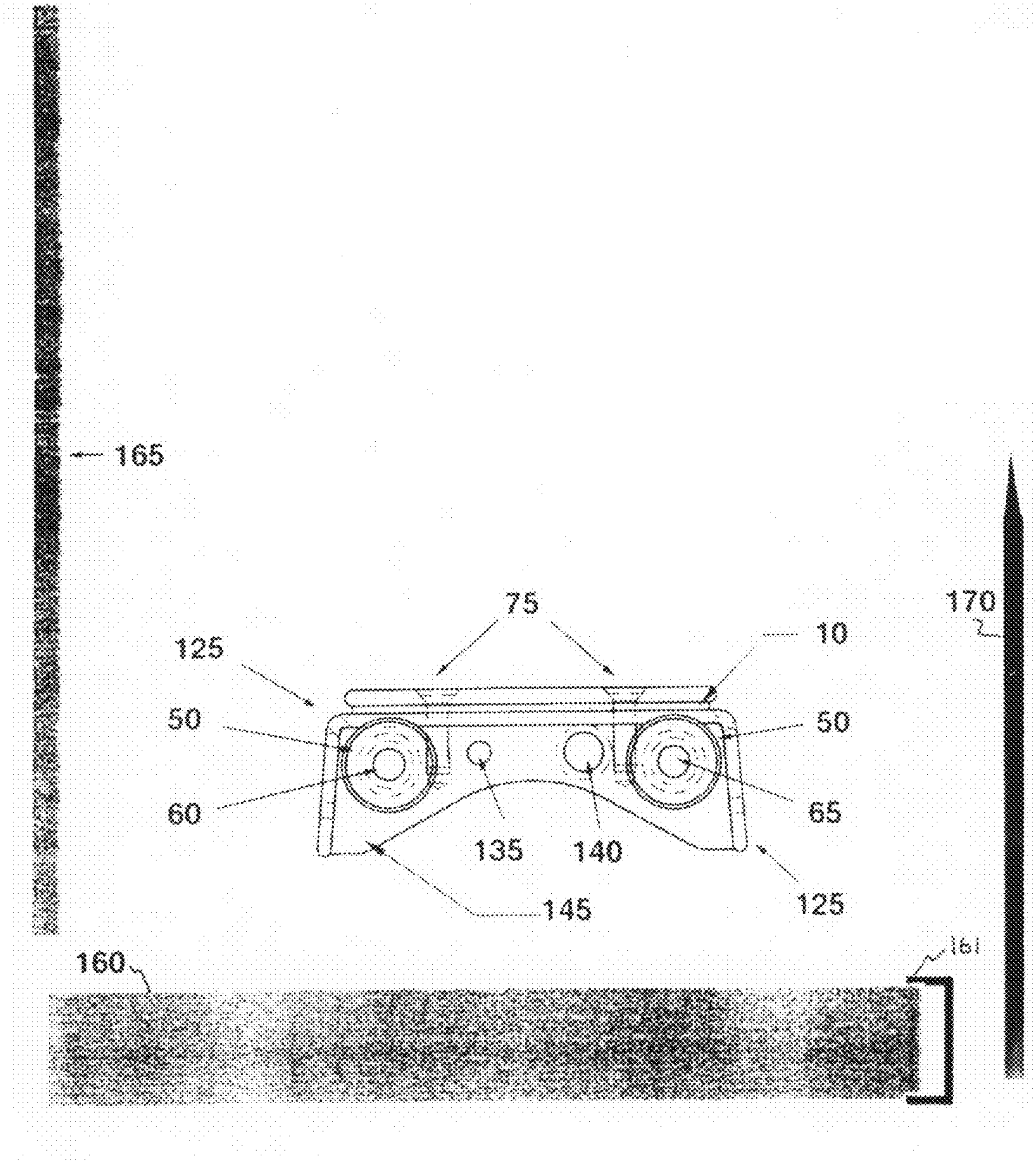
FIG. 7 is a side view of a second embodiment of the underwater drawing tablet according to the present invention.
Figure 8:
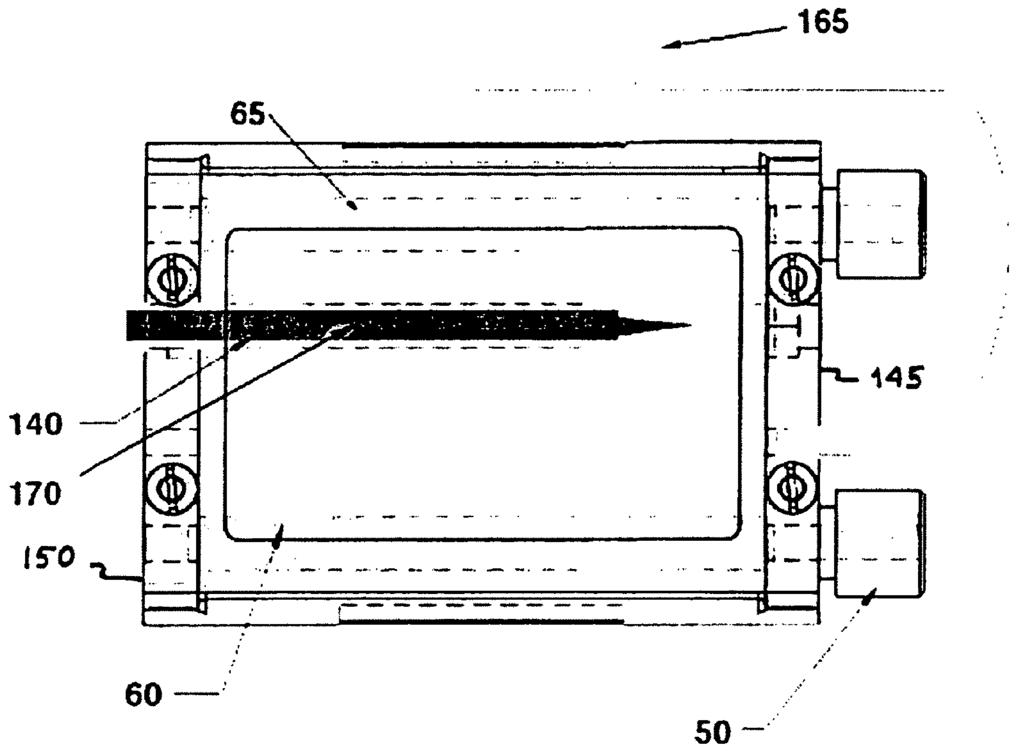
FIG. 8 is a top view of the second embodiment shown in FIG. 6.

The lower vellum roller 60 and the upper vellum roller 65 are held in place by the right and left cover plate supports 145 and 150 shown in FIGS. 6 and 8. Both vellum rollers 60 and 65 fit into openings in the left cover plate support 150, shown in FIG. 8, and extend through and beyond openings in the right cover plate support 145. One of roller knobs 50 is attached by pressure fitting to the right ends of each of the vellum rollers 60 and 65, shown in FIGS. 6 and 7.

The second embodiment of the submersible writing tablet is not designed to be dismantled since its small size makes this unnecessary. The vellum is advanced or rewound by turning the rotation knobs 50. The plastic vellum 2 extends from the lower roller 60, through the lower vellum slot 155 over the cover plate 125 to the upper vellum roller 65. The cover plate 125 is constructed of phosphorescent polypropylene or plexiglas to aid with visibility under low light conditions and may also include a grid as a drawing aid (not shown). The vellum 2 then passes through the upper vellum slot 155 to the upper vellum roller 65 and, as in the first embodiment, is attached by means of two diagonal vellum slots 63.

The vellum 2 is held in place by the drawing frame 10 that is attached to the cover plate 125 by means of four nylon screws 75 that pass through the cover plate 125 and thread into the left and right cover plate supports 145 and 150. Vellum 2 travels between cover plate 125 and drawing frame 10. Pencil holder 140 is positioned between the upper and lower vellum rollers 60 and 65 and attached to openings in the left and right cover plate supports 145 and 150, shown in FIGS. 7 and 8. Next to the pencil holder 140 is a small opening 135 into which one end of rubberized pencil holding tube 165 is held therein. The other end of pencil holding tube 165 is stretched over one end of the graphite drawing pencil 170.

Figure 9:
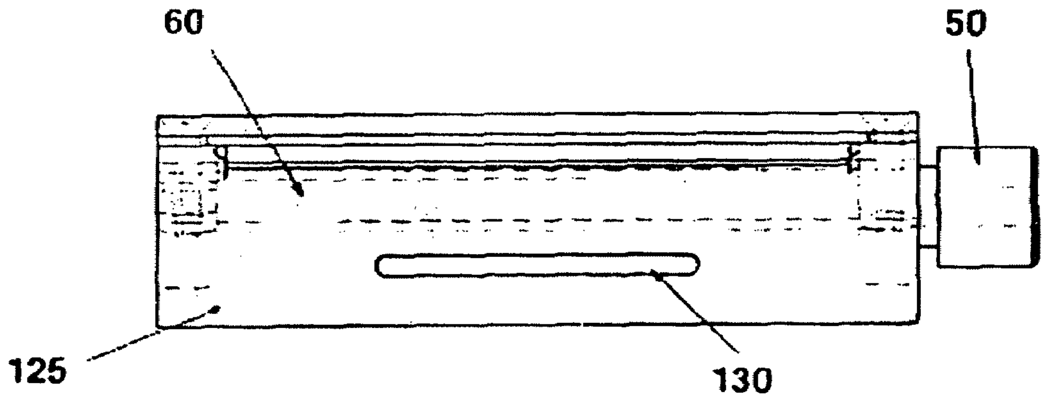
FIG. 9 is a side view of the second embodiment shown in FIG. 6.
Figure 10:
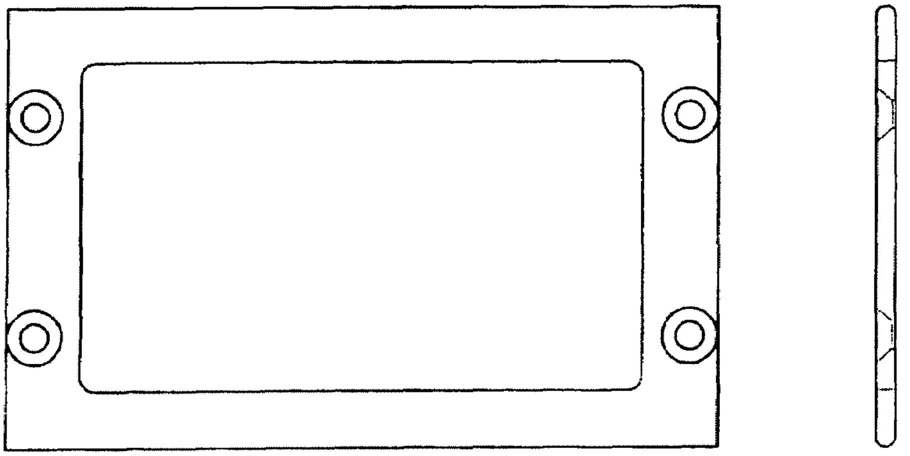
FIG. 10 is a detailed diagram showing the drawing frame of the second embodiment shown in FIG. 6.
Figure 11:
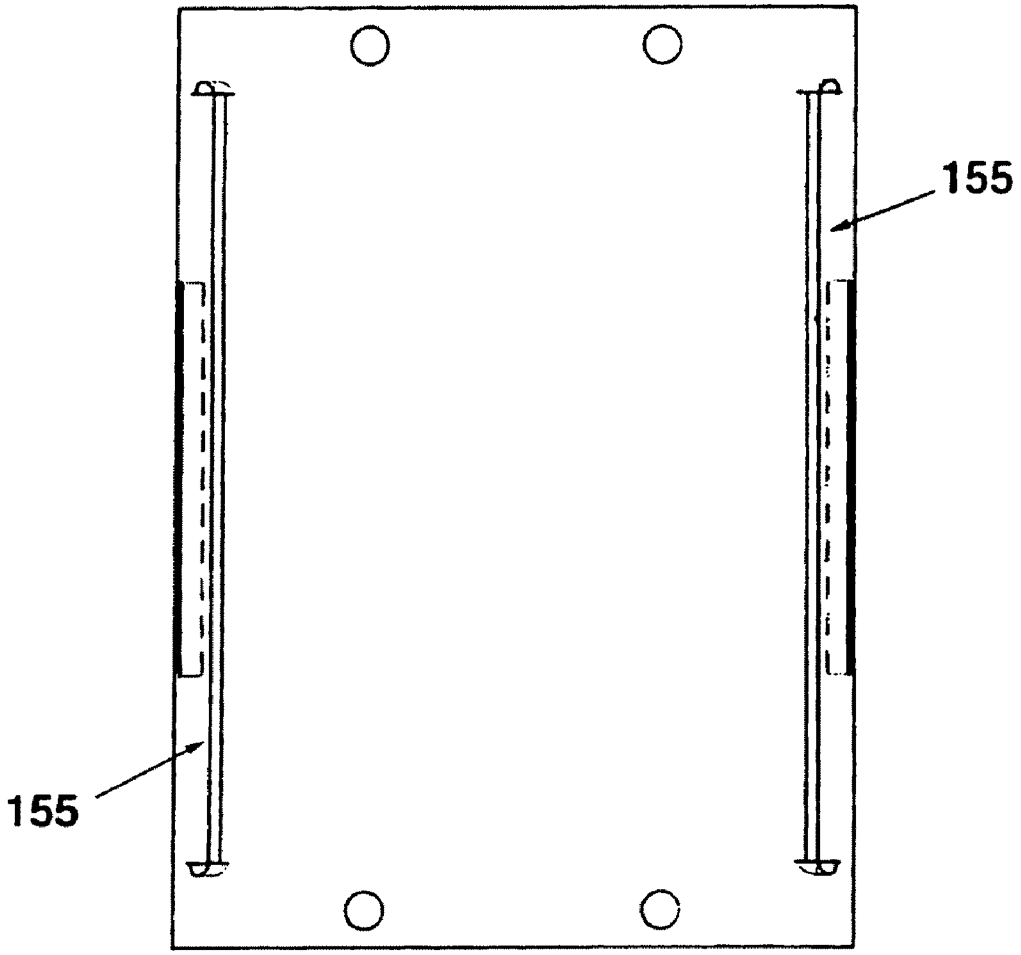
FIG. 11 is a top view of the cover plate of the second embodiment shown in FIG. 6.

The second embodiment of the submersible writing tablet is attachable to the diver's arm by means of a length of hook and loop material forming an arm belt 160 that passes through respective arm belt slots 130 on each side of the cover plate 125 as shown in FIGS. 6, 7, and 9. One end of the arm belt 160 passes through a plastic loop 161 sewn into the opposite end of the belt 160. The belt 160 is then folded back on itself and attached by means of the hook and loop material.

Thus, it is apparent that in accordance with the present invention an apparatus that fully satisfies the objectives, aims, and advantages is set forth above. While the invention has been described in conjunction with specific embodiments, it is evident that many alternatives, modifications, permutations, and variations will become apparent to those skilled in the art in light of the foregoing description. Accordingly, it is intended that the present invention embrace all such alternatives, modifications and variations as fall within the scope of the appended claims.

I claim:

1. An underwater writing tablet, comprising:

first and second plastic rollers;

first and second rotation knobs fitted at respective ends of said first and second plastic rollers;

a face plate positioned between said first and second plastic rollers;

a retractable member placed under said face plate and configured with drawing instrument holder; and a plastic vellum sheet rolled around said first and second plastic rollers and placed over said face place, wherein said plastic vellum sheet rolls between said first and second plastic rollers when one of said first and second rotation knobs is rotated by a user, and wherein said first and second plastic rollers, first and second rotation knobs and face plate are made of negative buoyant materials and the tablet has a slightly negative buoyancy at a depth of fifty feet so that the tablet does not sink or ascend rapidly underwater.

2. An underwater writing tablet, comprising:

first and second plastic rollers;

first and second rotation knobs fitted at respective ends of said first and second plastic rollers;

a face plate positioned between said first and second plastic rollers;

a retractable member placed under said face plate;

a plastic vellum sheet rolled around said first and second plastic rollers and placed over said face plate wherein said first and second plastic rollers, first and second rotation knobs and face plate are made of negative buoyant materials and the tablet has a slightly negative buoyancy at a depth of fifty feet so that the tablet does not sink or ascend rapidly underwater; and a tension adjustment mechanism configured to maintain a consistent tension in the vellum sheet when the vellum sheet is rolled around the plastic rollers in an underwater environment.

3. The underwater writing tablet according to claim 2, further comprising a release trigger assembly for releasing said retractable member.

4. The underwater writing tablet according to claim 2, further comprising a woodless graphite drawing pencil attached to said underwater writing tablet via a holding device.

5. The underwater writing tablet according to claim 2, further comprising a hook and loop material for holding a writing instrument.

6. The underwater writing tablet according to claim 2, further comprising a holding device for holding a writing instrument.

7. The underwater writing tablet according to claim 2, wherein the underwater writing tablet is configured so as not to retain air in the underwater environment and so as not to retain water when removed from the underwater environment.

8. The underwater writing tablet according to claim 2, wherein said underwater writing tablet is formed to have a negative buoyancy.

9. An underwater writing tablet, comprising:

first and second plastic rollers;

first and second rotation knobs fitted at respective ends of said first and second plastic rollers;

a face plate positioned between said first and second plastic rollers; and a plastic vellum sheet rolled around said first and second plastic rollers and placed over said face plate, wherein said plastic vellum sheet rolls between said first and second plastic rollers when one of said first and second rotation knobs is rotated by a user, and wherein said first and second plastic rollers, first and second rotation knobs and face plate are made of negative buoyant materials and the tablet has a slightly negative buoyancy at a depth of fifty feet so that the tablet does not sink or ascend rapidly underwater.

10. The underwater writing tablet according to claim 9, further comprising a tension adjustment mechanism configured to maintain a consistent tension in the vellum sheet when the vellum sheer is rolled around the plastic rollers.

11. The underwater writing tablet according to claim 9, further comprising a drawing frame attached to said face plate and wherein said plastic vellum sheet is placed between said face plate and said drawing frame.

12. The underwater writing tablet according to claim 9, wherein said face plate is formed of a phosphorescent material.

13. The underwater writing tablet according to claim 9, further comprising a handle placed between said first and second plastic rollers.

14. The underwater writing tablet according to claim 9, wherein said face plate includes a grid pattern.

15. The underwater writing tablet according to claim 9, further comprising a woodless graphite drawing pencil attached to said underwater writing tablet via the drawing instrument holder.

16. The underwater writing tablet according to claim 9, further comprising a hook and loop material for holding a writing instrument.

17. The underwater writing tablet according to claim 9, wherein the underwater writing tablet is made of one or more materials that are impervious to salt water.

18. The underwater writing tablet according to claim 9, wherein the underwater writing tablet is configured so as not to retain air in the underwater environment and so as not to retain water when removed from the underwater environment.

* * * * *